Patented Feb. 16, 1926.

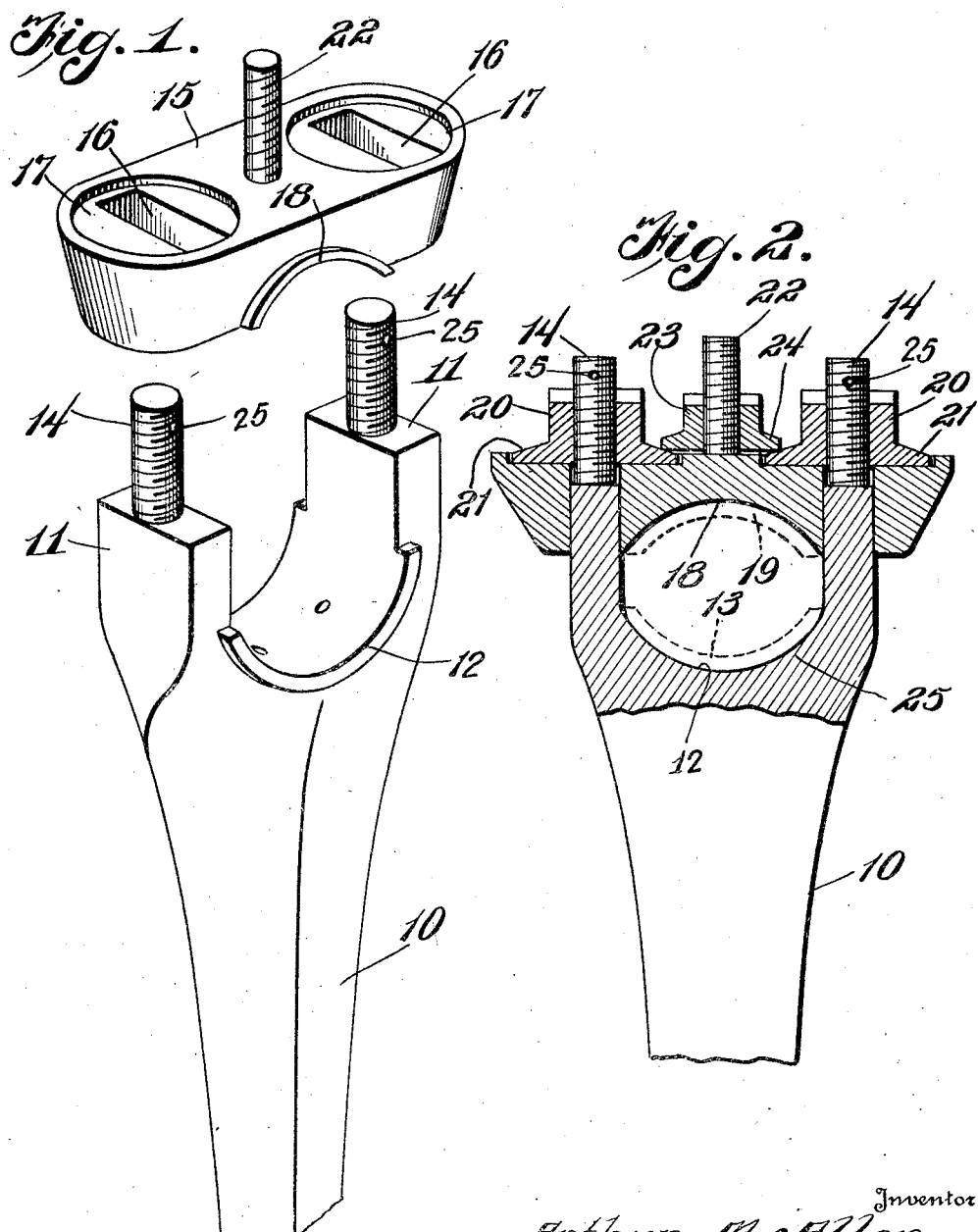

1,573,110

UNITED STATES PATENT OFFICE.

ARTHUR M. ALLEN, OF MESA, WASHINGTON, ASSIGNOR OF ONE-FOURTH TO EUGENE KIRBY AND ONE-FOURTH TO LOGAN L. LONG, OF CONNELL, WASHINGTON.

SHIMLESS BEARING.

Application filed August 1, 1925. Serial No. 47,585.

*To all whom it may concern:*

Be it known that I, ARTHUR M. ALLEN, a citizen of the United States, residing at Mesa, in the county of Franklin and State of Washington, have invented certain new and useful Improvements in Shimless Bearings, of which the following is a specification, reference being had to the accompanying drawings.

This invention relates to bearings and has for an important object thereof the provision of a bearing especially adapted for use on connecting rods and which may be employed without the use of shims.

An important object of the invention is the provision of means for holding the bearing cap properly in position without having the same solidly seated against the bearing proper as in the usual construction.

A further object of the invention is to produce in a device of this character a securing element which not only acts to hold the bearing in adjusted positions but likewise acts as a lock nut, preventing movement of the retaining elements for the bearing.

Other objects and advantages lie in the details of construction and arrangement of the various parts of the device, hereinafter to be more fully described.

In the drawings:—

Figure 1 is a perspective view showing the sections of a bearing constructed in accordance with my invention in detached relation;

Figure 2 is a vertical sectional view through the assembled bearing.

Referring now more particularly to the drawings, the numeral 10 generally designates a connecting rod, the end of which, in accordance with my invention, is bifurcated to form spaced arms 11 and a crotch 12 receiving one-half of the bearing liner 13 which may be of bronze, brass, babbitt, or the like. The arms 11 are rectangular, in cross section, having parallel side and end faces and are each provided with a reduced extension 14 forming a stud.

A cap 15 is provided having openings 16 therethrough receiving and fitting the arms 11, the outer ends of these openings being countersunk, as indicated at 17. The inner face of the bearing cap is adapted, as at 18, for the reception of the second half 19 of the bearing.

Upon each stud 14, when the bearing cap is in position, is placed a nut 20 having at its lower end a flange 21 adapted to extend into and fit the countersunk portion 17 of the openings 16. Projecting outwardly from the outer face of the cap is a stud 22 upon which is mounted a nut 23 having a flange 24 of such diameter that it overlies and abuts the upper faces of the flanges 21 of the nuts 20 when in applied position.

In the use of the device, it will be obvious that by adjusting the nuts 22, the possible spacing of the bearing elements 13 and 19 may be regulated and after these nuts have been adjusted, by clamping the nut 23 tightly so that its flange abuts the flanges 21, the cap is drawn firmly into engagement with the securing elements 20 and these securing elements are furthermore held against movement. To further insure against movement, each of the nuts 20 and 23 will preferably be cotter-keyed to its respective stud, openings being provided for the reception of the cotter keys as indicated at 25. Since the cap is held immovable without coming into clamping engagement with a face of the main bearing section 25 carried by the connecting rod 10, it will be obvious that the use of shims is eliminated and that accordingly the bearing may be adjusted in much less time than is ordinarily possible where shims are employed.

It will be obvious that the construction hereinbefore set forth is obviously capable of a certain range of change and modification without materially departing from the spirit of the invention and I accordingly do not limit myself to such specific structure except as hereinafter claimed.

I claim:—

1. In a bearing, a main bearing section including spaced arms, a cap therefor having openings receiving and fitting the arms, the arms having studs projecting through said openings, nuts upon the studs abutting the cap and each having a flange, a stud carried by the cap and a nut carried by the latter stud and abutting the flanges of the first named nuts.

2. In a bearing, a main bearing section including spaced arms, a cap therefor having openings receiving and fitting the arms, the arms having studs projecting through said openings, nuts upon the studs abutting the cap and each having a flange, a stud carried by the cap and a nut carried by the latter stud and abutting the flanges of the first named nuts, the cap at the outer ends of the openings having countersinks receiving and fitting the flanges of the first named nuts.

3. In a bearing, a main bearing section including spaced arms, a cap therefor having openings receiving and fitting the arms, the arms having studs projecting through said openings, nuts upon the studs abutting the cap and means adjustably engaged with the cap and said nuts for drawing the cap forcibly against the nuts.

In testimony whereof I hereunto affix my signature.

ARTHUR M. ALLEN.